United States Patent [19]
Von Brimer

[11] 3,875,489
[45] Apr. 1, 1975

[54] LINEAR SELF SYNCHRONOUS ELECTROMAGNETIC DRIVE SYSTEM FOR A SEWING MACHINE

[76] Inventor: Joe W. Von Brimer, 3664 Vegas Plaza Dr., Las Vegas, Nev. 89102

[22] Filed: Jan. 15, 1973

[21] Appl. No.: 323,949

Related U.S. Application Data

[62] Division of Ser. No. 114,233, Feb. 10, 1971, Pat. No. 3,735,717.

[52] U.S. Cl. ............... 318/691, 318/692, 318/687, 318/39, 112/220, 318/38
[51] Int. Cl. .......................................... G05b 11/12
[58] Field of Search ....... 318/37, 38, 690, 691, 692, 318/49, 50, 687, 39

[56] References Cited
UNITED STATES PATENTS
2,441,869  5/1948  Childs ............................... 318/690
3,457,482  7/1969  Sawyer ............................... 318/38

Primary Examiner—T. E. Lynch

[57] ABSTRACT

A drive system for controlling and synchronizing the movement of two or more relatively movable members, one of which is to be driven with any desired amplitude and at any desired rate, and one or more others of which have the movement thereof determined by the movement of the first member. One relatively movable member typically comprises a non-magnetic, electrically conductive armature, such as a reciprocating metal slide operating axially in the air gap between an electromagnetic stator containing plural distributed multiphase windings and a return piece for the flux paths thus generated. Another relatively movable element typically comprises a permanent magnet armature driven by an associated linear actuator also having multiphase windings distributed therein and adapted to create a field of the character indicated by a control signal emanating from a unit detecting the movement of the first movable member. In a described embodiment, the first element includes a carrier for a magnetic sender moving in relation to the coils in a magnetic detector, while the driven or second member includes an amplifier for the signal supplied to it by the detector. As embodied in a sewing machine, for example, the first member or driving element is in the form of a vertically movable slide carrying the needle, and the second or driven member is a horizontally movable armature serving as the bobbin carrier. The needle holder carries the magnet, pickup coils are located adjacent the movement path of the magnet, and the amplifier furnishes amplified pulses of a characteristic type to the windings distributed in the bobbin carrier so as to cause synchronized or slaved movement of the bobbin carrier. Means are typically provided for changing the voltage, current and polarity of the signal applied to the first element stator so as to permit varied movement characteristics to be imparted thereto.

5 Claims, 8 Drawing Figures

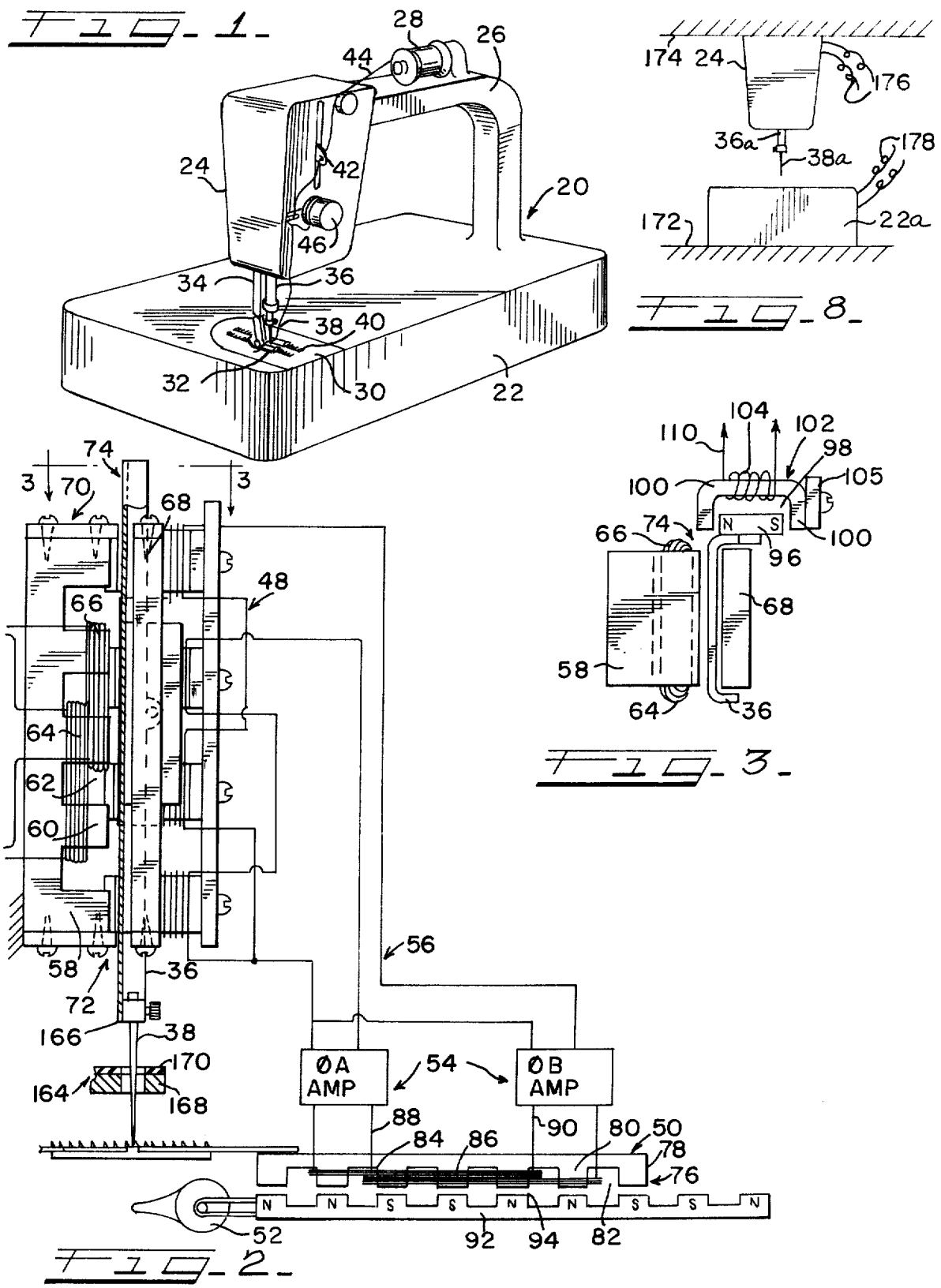

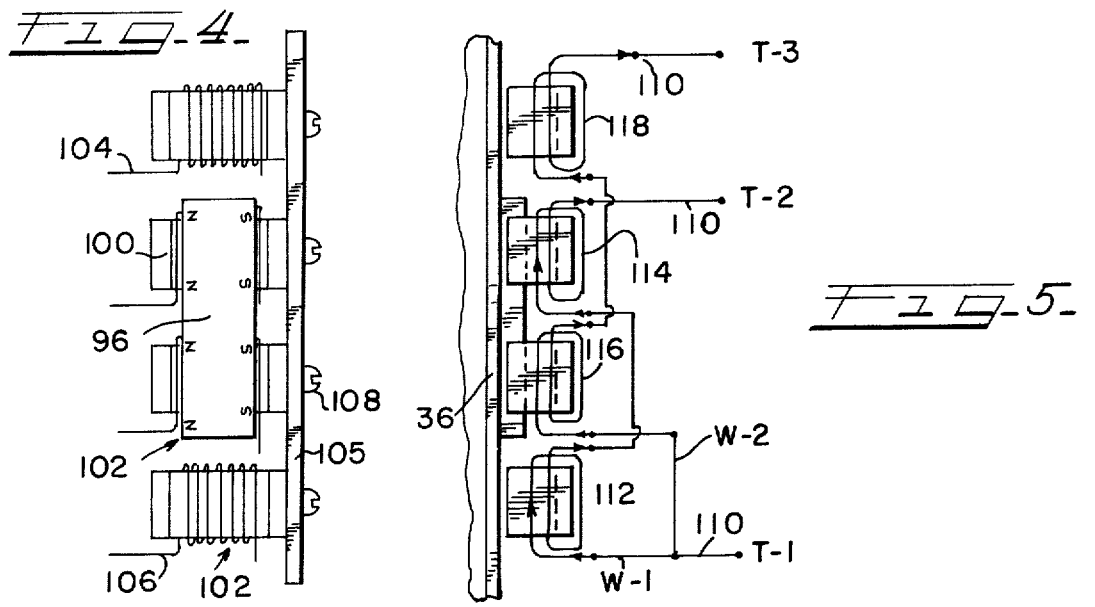
Fig. 4.
Fig. 5.
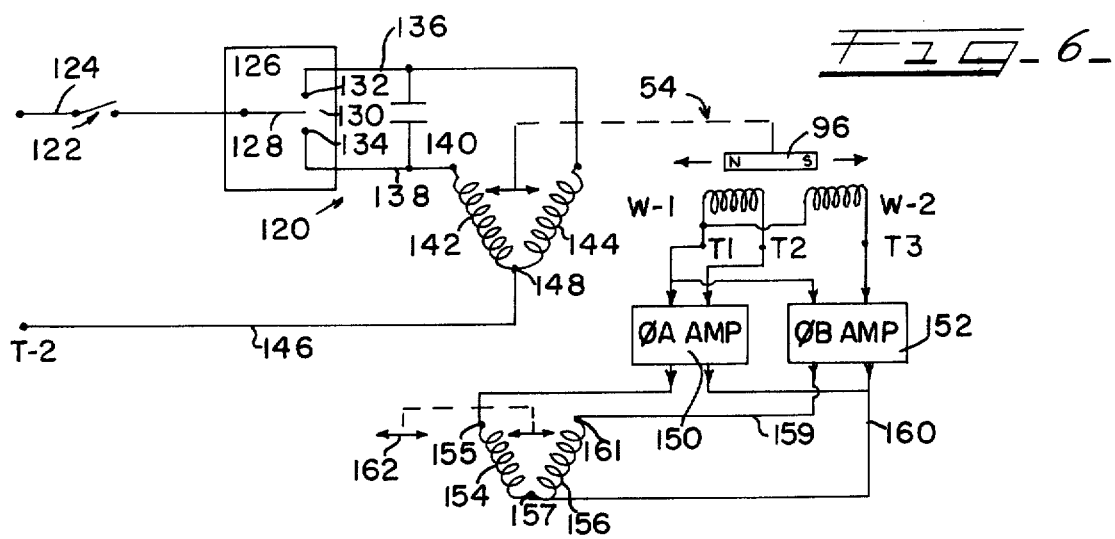
Fig. 6.
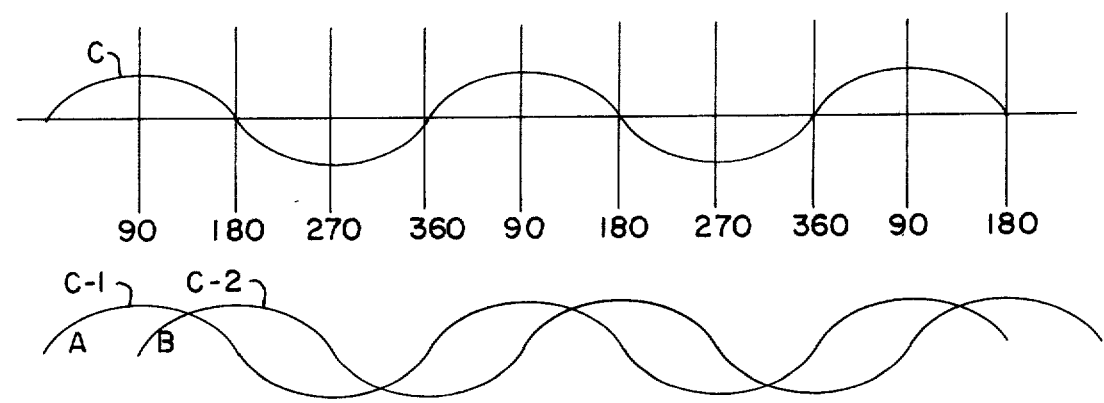
Fig. 7.

LINEAR SELF SYNCHRONOUS ELECTROMAGNETIC DRIVE SYSTEM FOR A SEWING MACHINE

This is a division of application Ser. No. 114,233, filed Feb. 10, 1971, now U.S. Pat. No. 3,735,717.

BACKGROUND OF THE INVENTION

The present invention relates to electromagnetic drive systems, and more particularly to drive systems having two or more driven parts intended to be actuated in close synchronism or closely correlated relative motion, including one or more so-called driving and one or more driven or slaved elements designed to provide coordinated mechanical functions with no mechanical connection therebetween, or with a minimum of mechanical coupling. For example, the present invention is applicable to drive systems designed for use with a sewing machine wherein the needle carrier slide moves with a reciprocating action through a workpiece supported on a sole plate, while a bobbin carrier reciprocates in another plane so as to move thread held below the sole plate into locking engagement with the thread moved by the needle to produce locked stitches in the work. It is well known that the actual motion of the needle holder or slide is a complex motion which is affected not only by the power applied to the machine, but also by the size and shape of the needle, the thickness of the thread, the type and texture of material being sewn, the thickness thereof, etc. In other words, the needle size and the material, among the other factors listed, would tend to determine the resistance to motion of the needle and slide through the material. In any event, however, the movement of the bobbin carrier should exactly or very closely follow the motion of the needle carrier and should therefore undergo a reciprocating or like motion sequency determined by the instantaneous position and direction of the needle holder. Other examples of machines to which the principles of the present invention are applicable include wrapping and packaging machines, splicers, projectors, heavy industrial machines of numerous types, hand tools, etc. However, since the sewing machine is a good example of a machine in which the basic need is for synchronized reciprocating movement of machine elements in nonparallel planes, a number of advantages and features generally characterizing the invention may be illustrated by describing such machine, by way of example.

In the prior art, machines such as sewing machines and the like have customarily been operated by a motor driving a flywheel or flywheel assembly in a circular path, and the flywheel is used as a direct energy source to drive the bobbin carrier, needle carrier, material feed pawls, and other elements in a desired sequence. These motions are accomplished by a relatively intricate series of gears, belts, crankshafts, yokes, cross heads, slides, rocker arms, bellcranks, complex profile cams, etc. Any one or more of which may be equipped with positioners, return springs, etc. As is normally the case with the transfer of rotating to reciprocating motion, various problems of dynamic balance are encountered, and vibration from the reciprocating motion is often considerable and troublesome, especially when wear creates loose connections between parts intended to be operated under conditions of close tolerance.

Accordingly, in the past, sewing machines and the like have been characterized by ingenious but complex mechanical components designed to bring about various coordinated motion sequences in a number of parts.

In some environments, it is long been considered desirable to produce rectilinear motion by direct electrical actuation, and, where possible, reciprocating motion in this manner. However, up until the present, it is believed that machanisms of this sort have not met with significant commercial success, primarily because it has not been possible to control these motions satisfactorily. Nevertheless, some reciprocating or oscillating motion problems have been generally overcome by the substitution of direct acting electrically driven members for the previously used members driven by complex geat trains or the like. Examples of such mechanisms are contained in the description of my U.S. Pat. No. 3,194,032 and in patent applications presently pending in the U.S. Pat. office.

Accordingly, in view of certain of the demonstrated advantages of directly actuated driven members, there has been a renewed interest in the concept of direct linear actuation of other classes of machines and drive systems, including those calling for relatively complex motion, examples of which are referred to elsewhere herein.

However, it has heretofore been believed that synchronizing the motion of such elements would be difficult, if not impossible, and therefore such concept would be advantageous only if a highly precise but still economical control system were devised to relate closely the motion given to one movable part to the motion actually given to another relatively movable part.

In view of the above, it is an object of the present invention to provide a drive system having two or more movable parts which may be mechanically separate or separable, and which may be electrically actuated in a manner such that the movement sequence of one element is determined by the movement sequence actually undergone by another element.

A further object is the provision of a control system operating so as to relate the motion of a reference or driving electrical member to the motion of one or more driven electrical members, even in the absence of a mechanical connection between the members.

A further object is to provide a mechanical motion system wherein a signal is generated by movement of one mechanism element, and wherein this signal is detected and amplified substantially instantaneously to sufficient levels so as to be useful in inducing and controlling the motion of an operatively associated element.

A further object is the provision of such a system wherein actuation of the movable parts takes place in response to magnetic forces applied to conductive armatures associated with electromagnetic stators or field pieces having two or more multiphase electrical windings distributed therein and adapted to create moving magnetic fields.

A further object is the provision of a mechanism wherein multiphase electrical windings distributed in a motor pole piece or stator drive an armature of a permanent magnetic type in response to signals created by the movement of the armature of a relatively remote conductor lying in the air gap between a magnetic pole piece and means providing for the return of the flux paths created in the pole piece.

Another object is the provision of a sewing machine or like structure wherein the needle carrier or holder, in undergoing reciprocating motion, generates a signal whose characteristics form the basis for the movement sequence undergone by an associated bobbin carrier.

Another object of the invention is the provision of a control mechanism utilizing impulses generated by a magnet moving through fields created by pickup coils as the pattern for creating an amplified signal necessary to drive an associated part in a desired motion sequence.

Another object is the provision of a sewing machine or like apparatus having a relatively light armature or needle carrier, thereby minimizing wear and providing rapid acceleration and deceleration of the needle with minimum current and heat loses.

Another object is the provision of mechanical drive unit having a plurality of linear induction motors or actuators with the stator of one unit generating flux paths and moving magnetic fields determined by an extrinsic source or mechanism, and which cause motion of a first member whose motion is in turn detected and fed back to a second or slave stator whose magnetic fields are thereby determined for causing replicate movement of a second or driven armature.

Another object is the provision of a sewing machine or like mechanism having at least two directly driven reciprocating members electromagnetically synchronized and supported by a minimum of physical structure.

Another object is the provision of a machine having at least first and second stators, multiphase windings distributed within each stator, a movable armature associated with each stator, a magnetic return path for the magnetic flux generated by each stator, a position indicating element and sensor associated with at least one of the armatures, and means for controlling the current in the windings of at least one of the remaining stators so as to drive any armature associated therewith in a predetermined relation to the movement of the armature associated with the first stator.

These and other objects of the invention are accomplished by providing at least two motor stators, at least two armatures, and means for controlling the motion of at least one of the second armatures in response to a signal indicative of the instantaneous position and direction of movement of the first armature. The manner in which the foregoing objects and advantages of the present invention are achieved will become more clearly apparent when reference is made to the accompanying detailed description wherein several illustrative embodiments of the invention are described, and when reference is made to the drawings, in which like reference numerals indicate corresponding parts throughout.

BRIEF DESCRIPTION OF THE DRAWINGS

FIG. 1 is a perspective view of a sewing machine embodying the invention;

FIG. 2 is an enlarged view, partly in section and partly in elevation, showing the principal elements of the mechanism of the invention and showing certain of such elements thereof somewhat diagrammatically;

FIG. 3 is a vertical sectional view taken along lines 3—3 of FIG. 2 and showing certain of the control elements of the invention;

FIG. 4 is an elevational view of the control system of the invention;

FIG. 5 is a side elevational view of the system of FIGS. 3 and 4;

FIG. 6 is a diagrammatic view of the control system of the invention;

FIG. 7 is a diagrammatic view showing graphs of an alternating current wave form and showing the wave forms developed in the windings associated with one of the stators of the invention; and FIG. 8 is a schematic view of another form of sewing machine or like apparatus which is made possible by the use of principles of the invention.

DESCRIPTION OF THE PREFERRED EMBODIMENTS OF THE INVENTION

Although the present invention may be embodied in a number of devices having diverse functions and purposes, a detailed description of the invention herein will be made by reference to a representative first embodiment wherein one armature is a needle carrier and the other a bobbin carrier, and wherein these elements are synchronously operated in a sewing machine of another wise conventional type.

Thus, referring now to FIG. 1, the invention is shown to be embodied in a sewing machine 20 having a base portion 22, a head 24 and a support unit 26 extending between the base 22 and the head 24. A supply of thread 28 may be disposed atop the support 26, and, in the customary manner, a sole plate 30 covers a portion of the mechanism (FIG. 2) which includes the bobbin carrier and the like. In certain respects, including the provision of a presser foot 32, a support unit 34 therefor, a needle holder 36, a needle 38 and one or more feed pawls 40, the construction of the sewing machine 20 is conventional. Likewise, the head may include one or more guide elements 42 for the thread 44, a tensioning mechanism 46, and other elements which are in themselves well known in the art and which do not per se form a part of the present invention which is novel. However, in reference to FIG. 1, it will be noted that, in contrast to prior art sewing machines, the head support 26 is of reduced thickness since its only function is to support the head 24 and, by reason of certain features of the invention which will presently be described in greater detail, the mechanism which would otherwise be present and accommodated in the head support 26 has been eliminated.

Referring now to FIGS. 2 and 3, it may be seen that the invention is typically embodied in a mechanism comprising an assembly 48 adapted to carry the needle 38, an assembly 50 adapted to move the bobbin carrier 52 in a synchronous or other predetermined relation to the needle carrier 36, and a control unit 54, portions of which, as shown in FIG. 2, may be located adjacent each assembly 48, 50 with connectors 56 forming a part of the control mechanism 54 extending between portions of the control assembly 54 which will presently be described in greater detail. Referring again to FIG. 2, it is shown that the needle moving assembly 48 includes the elements of a linear induction motor or linear actuator, namely, (1) a pole piece 58, having a plurality of teeth 60 defining therebetween a plurality of slots 62 in which are distributed multiphase windings 64, 66, (2) a so-called return iron 68 providing return paths for the magnetic flux generated in the stator assembly 70 which in turn includes the pole piece 58 and windings 64, 66, as well as the air gap 72 defined by oppositely facing edges of the pole piece 58 and the return iron 68, and (3) an armature 74 disposed within the air gap 72 for linear movement within and parallel to the longitudinal extent of the air gap 72. In this case, the armature 74 forms the major portion of the needle carrier 36.

Referring now to the bobbin carrier actuating mechanism 50, FIG. 2 also shows that a stator assembly 76 includes a pole piece 78 having plural teeth 80 defining slots 82 therebetween and it is also shown that windings 84, 86 are distributed within the slots 82 and that pairs of connectors 88, 90 are provided for supplying current in first and second, time separated phases to the windings 84, 86. An armature 92 is disposed in oppositely facing relation to the stator assembly 76 and is separated therefrom by an air gap 94. The armature 92 includes a plurality of magnetic poles therein which serve to cause movement of the armature 92 and the bobbin holder mechanism 52 in a manner to be described in further detail herein.

Referring now to FIGS. 3–5, inclusive, it is shown that, in addition to holding the needle 38, the armature 74 has fixedly attached thereto or otherwise associated therewith signal generating means in the form of an elongated permanent magnet 96 which moves within a second air gap 98 partially defined by the legs 100 of core elements 102 having magnetic coils 104 associated therewith. Typically, referring to FIG. 4, there may be four magnetic cores 102 mounted to a common bar 106 by fasteners 108, each core 102 having coils 104 wound thereon, and which are energized by passage adjacent thereto of permanent magnet 96, moving within the air gap 98. Accordingly, it will be seen that movement of the carrier 36 and the associated magnet 96 will induce a characteristic current or signal in the coils 104 and that the leads 106 coming therefrom will have flowing therein a signal or current which has a characteristic direction, intensity, and rate of buildup dependent upon the position and movement of the magnet 96 associated with the needle carrier 36.

By reference to FIG. 5, it will be seen that the leads 110 to which the coils 104 are attached are so arranged that one end of a winding W–1 is attached to terminal T–1 and the other end thereof is connected to a second terminal T–2, with winding W–1 forming detector coils 112, 114 respectively on alternate cores 102. The other winding W–2 has one end connected to terminal T–1, and the other end connected to a third terminal T–3, and intermediate portions thereof form detector coils 116, 118 which are interdigitated or alternately disposed with respect to the other detector coils 112, 114.

Referring now to FIG. 6, a control circuit generally indicated at 54 is shown to be associated with a main power circuit 120 which will now be described.

This circuit 120 includes a principal on-off switch 122 with one line 124 thereof adapted to be connected to one terminal of an alternating current source. A rapidly reversing switch assembly 126 is provided having a flexibly mounted, low inertia blade such as a reed 128, for example, with one end 130 thereof movable between first and second contacts 132, 134 associated respectively with lines 136, 138, across which is connected a phase shifting capacitor 140. Lines 136, 138 are connected respectively to windings 142, 144 which, in a typical embodiment, may be the same as or similar to the first stator windings 64, 66. A second or return line 146 completes the circuit between another alternating current terminal T–2 and a point 148 common to both windings 142, 144.

Accordingly, it may be appreciated that with the reed 128 in one position, for example, with the end 130 thereof in contact with contact 132, the current flow in the windings 142, 144 would be out of phase by a predetermined amount which, according to known principles, would cause armature rotation in a given direction in a conventional induction motor, or, armature movement in a given linear direction in a linear actuator, since the magnetic fields thereby created would be moving in a predetermined direction. However, with the end 130 of the reed 128 associated with contact 134, the direction of magnetic field movement, and hence armature movement, will be in an opposite direction, although the presence of capacitor 140 would maintain the phase shift effect necessary to bring about motion. Accordingly, by reference to the main power circuit 120 it can be appreciated that normal operation thereof will result in armature movement in one of two directions, depending on the direction of the blade 128. Accordingly, rapid back and forth movement or oscillation of the blade 128 will cause rapid oscillation of any armature operatively associated with the windings 142, 144. Consequently, the rate of armature reciprocation thus induced will depend on the rate at which the contact portion or end 130 of the switch 128 is moved between positions. In this connection, it will be understood that a low-inertia reed type switch has been described as being one preferred form of device adapted to bring about this rapid switching action. The movement of the reed itself may be brought about by electromagnetic means (not shown) of a well known type, for example, by magnets controlled by a variable frequency oscillator. Other means may be provided to bring about rapid switching, such as the use of a purely electrical or electronic switching element, a purely mechanical switch, etc. The general concept of bi-directional movement of a linear actuator or linear induction motor armature is well known per se and is explained in my previously issued U.S. Pat. No. 3,194,032, wherein the driven armature is a disc used in a washing machine drive arrangement, for example.

Having in mind the above described method of operation of the circuit 120, and considering that the armature driven by the coils 142, 144 may be the armature 74 which includes the carrier 36 and its associated needle 38, it will be appreciated that means must be provided for moving the bobbin carrier 52 in a sequence related to the movement sequence of the needle carrier 36. Accordingly, the provision of the magnet 96 and the control circuit associated therewith can be appreciated. As is shown in FIG. 6, terminals T–1 and T–2, are associated with a so-called phase "A" amplifier 50, and terminals T–2 and T–3 are associated with a phase "B" amplifier 152. Thus, each amplifier is connected to the common signal input line, and each to the respective signal output line with which it is associated. As further shown in FIG. 6, one motor winding 154, is operatively connected at one end 155 thereof through line 158 to the phase A amplifier, and at the other end 157 thereof to a second motor winding 156 and to line 160, which is common to amplifier 150, 152 for both A and B phases. Inasmuch as one terminal of the phase A amplifier 150 is connected to line 158 for energizing motor winding 154, one terminal of the phase B amplifier 152 is connected through line 159 to terminal 161 of the other or second motor winding 156. Thus, an associated armature shown diagrammatically at 162 will undergo movement which replicates the movement of the signal generator magnet 96. In the embodiment shown in FIG. 2, the bobbin carrier 92 corresponds to armature 162, although anyone or more armatures associated with correspondingly wired coils 154, 156, etc., and their associated control circuits would undergo such movement.

In the use of an apparatus which includes the novel drive system of the invention, such as the illustrated sewing machine, when the main power switch 122 is energized, current flow in a given direction will take place depending on the position of the reed 128 in the switch assembly 126. Assuming, for example, that the switch is in the upper position as shown in FIG. 6, the initial current flow will be through one winding 144 of the first or needle carrier stator 70 while flow through the other winding 142 will be out of phase therewith by reason of the presence of capacitor 140. This will produce armature movement in a given direction, for example, to the left as shown in FIG. 6 or downwardly as shown in FIG. 2. Since the signal generator or permanent magnet 96 forms a part of the armature 74, movement of the magnet 96 will be identical to movement of the armature 74 in response to current in the windings 144, 142. The movement of magnet 96 will generate a signal in pickup coils W-1, which is characteristic of the direction and movement rate of the generator or magnet 96. Accordingly, the signal appearing at terminals T-1 and T-2 will be amplified by the amplifier 150 and impressed across winding 154. The signal generated in winding W-2 appears across terminals T-1 and T-3, and this signal is amplified by the phase B amplifier 152 and impressed across winding 156. As a result, movement of the bobbin carrier 52 will occur, for example, to the left as in FIGS. 2 and 6. Accordingly, the thread carrying portion of the bobbin holder 52 and the tip of the needle 38 will be moved toward a point of approximate intersection at the same rate. Assuming that the desired stroke is completed, or is soon to be completed by the inertia of the carrier 36, and the needle 38 is to be moved upwardly, the reed 128 is switched so as to contact the opposite terminal 134, causing reversed connections to take place in respect to the first motor windings 142, 144. This will produce an opposite terminal movement of the armature 74 so as to cause it to move upwardly as shown in FIG. 2 or to the right as shown by the arrow in FIG. 6. The movement of the permanent magnet 96 forming a part of the armature 74 will likewise cause a signal which is the reverse of the earlier signal to appear across terminals T-1 and T-2 and T-1 and T-3, respectively. These signals are in turn amplified by their associated amplifiers 150 and 152 and supplied to the windings 154, 156, it being noted, however, that the polarity or movement direction thereof has been reversed. This will cause movement to the right as schematically shown by the arrows in FIG. 6, causing a withdrawing motion of the bobbin carrier 52. The speed of movement of the armature 74 can be controlled by varying the strength of the signal to the switch unit 126, while the cyclic rate of movement can be controlled by the frequency of oscillation of the reversing switch assembly 126. This frequency may be varied in a known manner, such as by utilizing an electronic control therefor (a multivibrator, for example) or by utilizing mechanical or electromechanical switching means, as pointed out herein. These units may in turn be mechanically or electronically driven in any desired manner known to those skilled in the art. Means may be provided in a known manner for supplying the current in lines 124, 146 at a higher cyclic frequency than the customary 60 cycle frequency, if desired, for example, by providing an associated oscillator circuit or its equivalent.

One feature of the invention is that, by reason of the arrangement of the pickup coils in relation to the movable magnet, there will always be two phases separated by a constant time interval in each amplifier, such phase difference being a normal characteristic of an alternating current linear actuator or linear induction motor. In other words, the terminal which is common to both sets of control windings is commonly connected to the amplifier for both phases, while an output end of each phase is connected to a different amplifier. In this way, as shown in FIG. 6, the amplified output of each phase will be supplied respectively to a winding of the stator, while the phase relationship between the two phases will always remain such that the bobbin holder or other armature will be able to be propelled. Since the actual movement of the armature of which the needle holder 36 forms a part is created by its movement, the signal whose characteristics are being fed to the drive coils of the second armature, the movement of the two armatures will be in substantially identical or very close relation to each other. By a suitable construction of the windings 112, 114 and 116, 118 forming detector or control windings W-1 and W-2, very accurate replicate movement may be imparted to any second or driven armature.

Referring now to FIG. 7, the upper portion thereof is a praphic representation of a typical sinusoidal wave form of alternating current "C," commonly characterized by a 60 cycle per second frequency. Referring to the lower portion of FIG. 7, wave forms C-1 and C-2 show current of a similar form, except that two phases "A" and "B" are present, with the "B" phase being 90° out of phase or being in so-called phased quadrature relation to the instantaneous strength and polarity of the other or "A" phase. Tow phases such as those illustrated are commonly used in alternating current induction motors, such as the linear induction motors of the type referred to herein.

Referring now to other aspects of the invention, it is apparent that means in the form of a needle carrier stop 164 may be provided for engaging the lower edge 166 of the needle carrier 36 so as to prevent undue downward motion thereof. Such a stop unit 166, if necessary to be provided, may typically comprise a metal or like structural member 168 with a resilient pad or striker plate 170 associated therewith to cushion the blow received by it in the event of excessive travel of the carrier 36. Such a unit may be provided to prevent undesired overtravel of the actuator, and may be adjustable so as to provide a positive carrier stop which is positionally adjustable. Similar restraints for the movable elements may be provided elsewhere in the mechanism, such as on one or both ends of the other armature 92 and may also be provided to prevent undue upward movement of the first armature 74.

In connection with a discussion of the various armatures herein, it will be understood that, in the first instance, the needle carrier or other armature is driven by an associated stator, and in this sense, is a driven armature. However, since one or more other armatures, such as the armature 92 are driven in response to the movement of the first armature, the first armature may in this sense be considered a driving member rather than a driven member, since it carries an associated signal generator whose motion is detected by the pickup coils for amplification and application to the stator of one or more secondary or slaved armatures whose motion replicates that of the first armature. From the foregoing description, it is also clear that the signal which is generated by movement of the first armature and which is detected and amplified for application to the second armature, may be applied to two or more second or slaved armatures, depending on the structure of the mechanism in question. Likewise, in the case of plural secondary armatures, the movement undergone thereby need not be the same for each secondary armature, but may be determined by the characteristics of their associated pickup coils, with plural pickup coils of different characteristics being provided for this purpose, if desired. Such variations, and other modifications and variations will be apparent to those skilled in this art.

Referring now to FIG. 8, the construction of a generally similar machine 20a is shown wherein the base 22a is supported on a floor or other fixed member 172, and the head 24a is supported from a ceiling or like overhead structure 174, spaced apart from the floor 172 by a considerable distance. This figure schematically illustrates a needle 38a associated with a needle carrier 36a. A plurality of connectors 176, 178 are shown to be present for furnishing a signal generated by movement of carrier 36a in the head 24a to movement control means associated with the base 22a. This illustration makes it apparent that one advantageous feature of the present invention is that a mechanism such as a sewing machine or other mechanism may be constructed with mechanical elements thereof being completely separate from each other and requiring only electrical connections therebetween to achieve the same degree of synchronism as might be provided by machine connections which, in the illustrated machine, would be impractical. As applied to a sewing machine, for example, this construction is advantageous where the nature of the work being sewn, such as sail cloth or the like, is present in large quantities and unlimited working space must be provided between upper and lower machine parts, uninterrupted by vertical columns which would otherwise be present to accommodate mechanical parts.

From the foregoing, it is obvious that other machine drives and the like are readily adapted for use of in systems such as this, including systems wherein parts or elements may be fed from remotely spaced supply points to a common point for assembly, where spaced apart elements coact for forming work pieces, where articles are positioned for filling, where indexing or registration is required between movable parts, such as in printing and the like, and in other machines and elements.

Although the present invention is illustrated by reference to an embodiment wherein the return stroke of a reciprocating or oscillating motion sequence is carried out electromagnetically, it is obvious that a mechanism having the advantages of the present invention can be constructed wherein movement in one direction is caused by electromechanical forces acting against a preset force, and wherein return of the movable element is in response to the reaction force thereby created, that is, each armature might overcome the force of a return spring in moving in one direction, and the return spring would be used to propel the armature back to its initial position after actuation. In such a case, direction-reversing means for the armature would not be required.

Although the present invention is capable of being used advantageously with a great variety of construction materials, it is preferred that the needle carrier 36 to be electrically conductive, non-magnetic, light weight material, such as aluminum. The pole pieces and so-called return irons are preferably of a soft iron material, while the windings normally comprise copper wire. The amplifier may be of any construction, but the nature of the invention is such that the amplifiers may be relatively simple, consisting principally of a single semiconductor controlled rectifier ("SCR"), a "Triac," a silicon bilateral switch, or a single transistor unit of suitable design. In generating the signal which forms the basis for the movement of the second armature, a second phase may be provided by different control windings, as illustrated, or plural magnets may be used, with each magnet creating one phase of current which is amplified and fed to the second set of stator coils.

It will thus be seen that the present invention provides a novel electromechanical drive system or the like having a number of advantages and characteristics including those herein specifically pointed out, and others which are inherent in the invention. Since only illustrative embodiments of the invention have been described in detail, it is apparent that modifications and variations may be made by those skilled in the art without departing from the spirit of the invention or the scope of the appended claims.

I claim:

1. An electromechanical drive system comprising, in combination, a first electromagnetic stator and a first electromagnetic armature associated therewith and adapted to undergo a first movement cycle in relation to magnetic fields generated in said first stator, at least one secondary stator and at least one associated secondary armature adapted to undergo a movement sequence determined by the magnetic fields generated in said secondary stator, a pair of multi-phase windings mounted adjacent to said first armature, means comprising at least one permanent magnet carried on said first armature for generating control signals in said windings indicative of movement of said first electromagnetic armature, means comprising at least one amplifier responsive to said control signals in respective ones of said windings for supplying actuating current to said secondary stator whereby said secondary armature is driven in synchronism with said first armature.

2. A system as defined in claim 1 which further includes means for supplying current to said first associated stator so as to cause relative movement of said magnetic fields in one direction, and means for causing relative movement of said magnetic fields in another direction, said first stator current supply means being capable of being rapidly reversed.

3. A system as defined in claim 1 wherein one terminal of each of said phase windings is connected in common to one input terminal of each of said phase amplifiers, and wherein the remaining terminals of said phase windings are connected to the remaining terminals of respective ones of said phase amplifiers.

4. A system for producing substantially synchronous movement of two or more machine members which are movable in relation to each other and in relation to a fixed point, said system including first and second stator units, first and second sets of multiphase electrical windings distributed within each of said stator units, respectively, first and second movable armature assemblies operatively associated with and movable relative to respective ones of said first and second stator units, magnetic return paths for the magnetic flux generated within each said stator units, means comprising a pair of pickup windings disposed adjacent the movement path of said first armature, means comprising a permanent-magnet associated with said first armature for generating a control signal in said first set of electrical windings indicative of the position of said first armature in relation to a predetermined point on said first stator, means for controlling the magnetic flux in said second stator unit, and means comprising at least a pair of phase amplifiers connected between said pickup windings and said controlling means, whereby the magnetic flux induced in said second stator unit is controlled by the relative position of said first armature so as to cause said second armature to move in synchronism with said first armature.

5. A system as defined in claim 4 wherein said first and second stator units each include a plurality of teeth around which said windings are distributed so as to form magnetic poles at said teeth, and wherein at least one of said armatures comprises an electrically inactive, non-magnetic element.

* * * * *